June 3, 1958 — E. L. EIFFERT — 2,837,327
LETTER SCALE
Filed Feb. 19, 1957 — 2 Sheets-Sheet 1
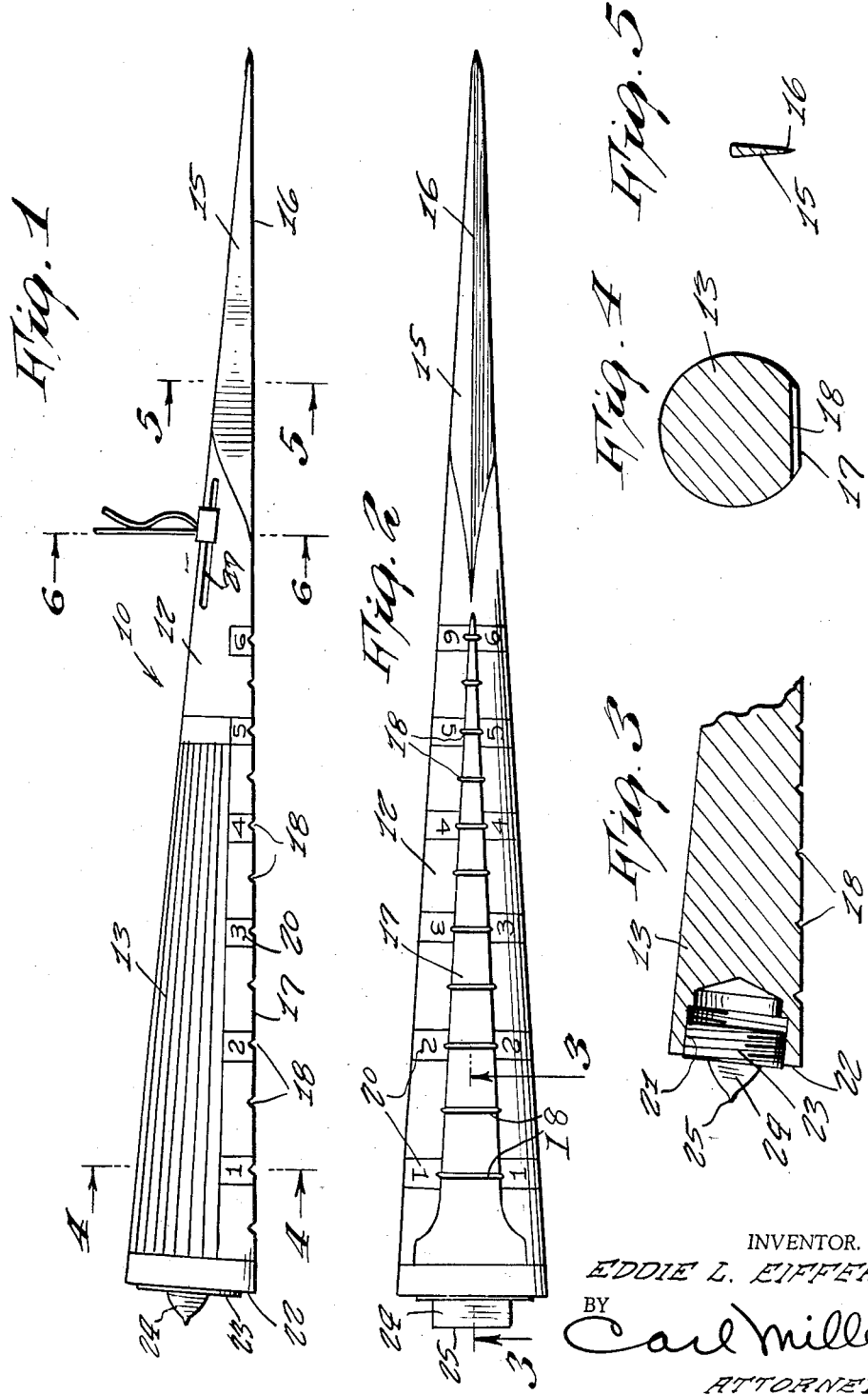
INVENTOR.
EDDIE L. EIFFERT
BY Carl Miller
ATTORNEY June 3, 1958
E. L. EIFFERT
2,837,327
LETTER SCALE
Filed Feb. 19, 1957
2 Sheets-Sheet 2
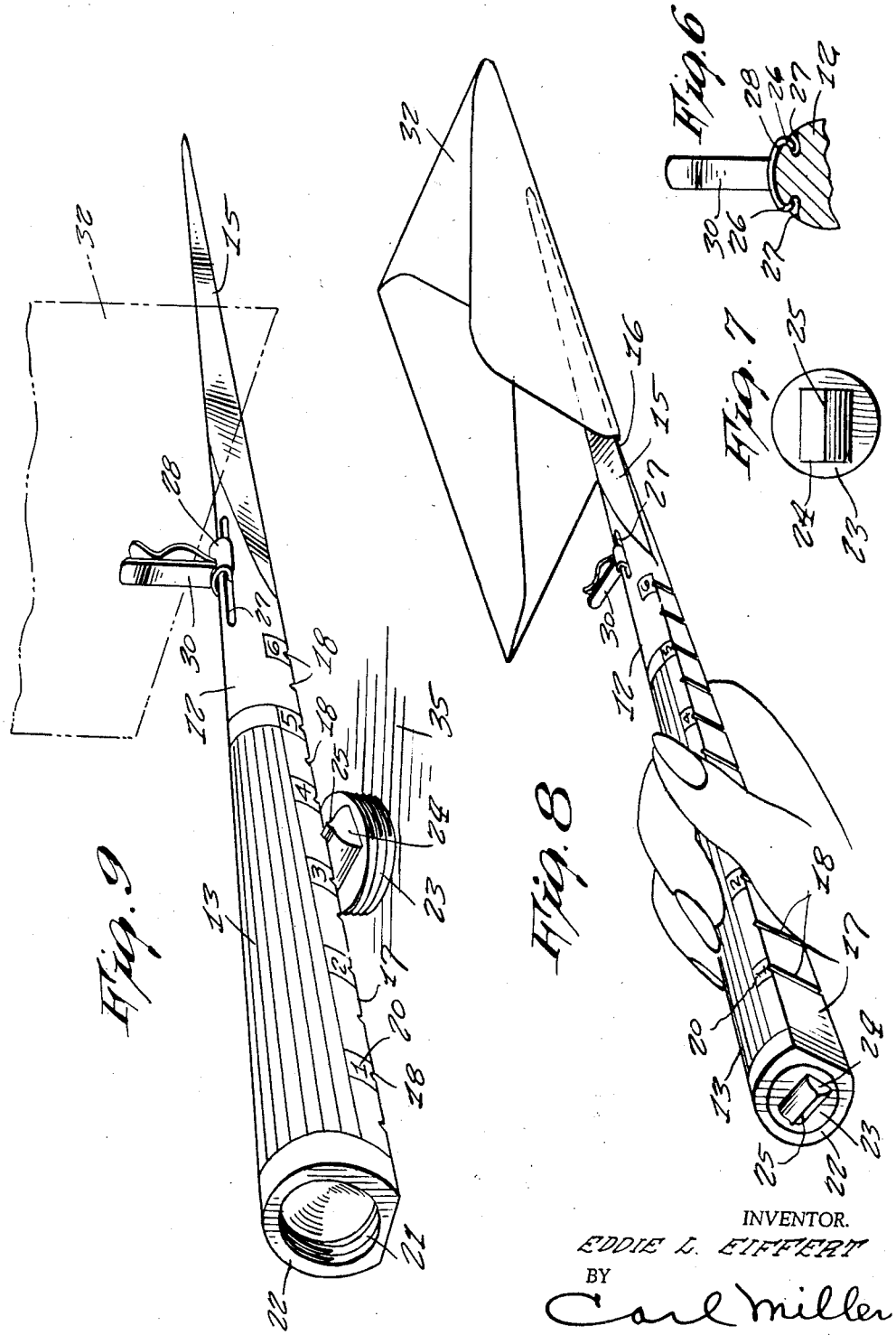
INVENTOR.
EDDIE L. EIFFERT
BY
Carl Miller
ATTORNEY

United States Patent Office 2,837,327
Patented June 3, 1958

2,837,327

LETTER SCALE

Eddie L. Eiffert, Pomona, Calif.

Application February 19, 1957, Serial No. 641,136

2 Claims. (Cl. 265—53)

This invention relates to apparatus for weighing and opening mail.

Ordinarily, it is necessary to have separate apparatus for opening and for weighing letters that are received and mailed, respectively. Oftentimes, one or the other of such devices are difficult to locate, thereby resulting in a loss of time and effort. Accordingly, an object of this invention is to provide a combination mail scale and letter opener that is simple in construction, efficient in operation, and which will overcome the aforementioned inconveniences.

Another object of the present invention is to provide a scale for weighing letters to be mailed that has no moving parts, is extremely accurate, and which may be adjusted for various degrees of accuracy.

A still further object of the present invention is to provide a combination mail scale and letter opener that is very attractive in appearance, easy to handle, and which may be manufactured in large quantities at relatively low cost.

All of the foregoing and still further objects and advantages of this invention will become apparent from a study of the following specification, taken in connection with the accompanying drawing, wherein:

Figure 1 is a side elevational view of a combination mail scale and letter opener made in accordance with the present invention;

Figure 2 is a bottom plan view of the device shown in Figure 1;

Figure 3 is a cross sectional view taken along line 3—3 of Figure 2;

Figure 4 is a cross sectional view taken along line 4—4 of Figure 1;

Figure 5 is a cross sectional view taken along line 5—5 of Figure 1;

Figure 6 is a fragmentary cross sectional view taken along lines 6—6 of Figure 1;

Figure 7 is a plan view of one of the elements of the device;

Figure 8 is a perspective view showing the apparatus in use as a letter opener; and Figure 9 is a perspective view showing the device in use as a mail scale.

Referring now to the drawing, and more particularly to Figures 1 and 2 thereof, a mail weighing device 10 made in accordance with the present invention is shown to include a main body portion 12 having a handle 13 at one end and a letter opener blade 15 at the opposite end. The blade 15 is provided with an edge 16, while the handle 13 is provided with a flat 17 on one side that lies in a plane substantially perpendicular to the plane of the blade 15.

As is more clearly shown in Figures 3 and 4, this flat 17 is provided with a series of parallel longitudinally spaced and transversely extending grooves 18 that are spaced apart at unequal intervals. The adjacent portions of the handle 13 include indicia 20 for certain ones of the grooves 18, which indicia preferably indicate weights running from one ounce to six ounces on the scale. For convenience, a sufficient number of grooves are provided so that half ounce readings may also be had between the main indicia 20.

The handle end 22 of the device is provided with a longitudinally extending and internally threaded bore 21 that is adapted to threadingly engage the similarly threaded base 23 of an end closure. This closure is also provided with an arcuate projection 24 that has a relatively sharp edge 25 centrally disposed thereon projecting outwardly therefrom. This base 23 and edge 25 is used as a fulcrum in a manner hereinafter described.

The intermediate portion of the main body 12 is provided with a pair of substantially circumferentially spaced and longitudinally extending grooves 27 that are adapted to receive a pair of inwardly extending legs 26 of a clamp device 28, as more clearly shown in Figure 6. This clamp is provided with an outwardly extending spring clip 30 which lies in a plane substantially perpendicular to the plane of the flat 17 of the handle portion and is adapted to clampingly receive a letter or envelope 32 therein, as more clearly shown in Figure 9.

In use, the device 10 may be held by the handle 13, whereupon the blade 15 may be used to open envelopes 32, in the manner shown in Figure 8. To use the device as a scale, the end closure 23 is removed from the handle 13 and placed upon a flat surface 35, in the manner shown in Figure 9. The weight of the envelope is then approximated and the knife edge 25 of the projection 24 placed within the groove corresponding to that approximated weight. For example, in Figure 9, the edge is placed within the groove indicating three and a half ounces. In the event that the envelope is heavier than that approximated, the weight thereof will raise the handle end 13 of the device, after which, the fulcrum can be engaged with a groove corresponding to a higher weight and the aforementioned procedure repeated. When the weight of the envelope is insufficient to raise the handle end 13, this will indicate that the letter does not exceed the approximated weight, whereupon the proper amount of postage stamps may be placed upon the letter. Since certain conditions could affect the accuracy of the scale, the spring clip 30 may be adjusted along the length of the grooves 27, as may be required.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. Weighing apparatus comprising, in combination, an elongated main body member, there being a plurality of parallel longitudinal spaced transversely extending grooves in one side of said body member, a fulcrum member adapted to selectively engage one of said grooves and support said main body member for pivotal movement thereon, and clamp means mounted on an opposite side of said main body member for supporting an envelope, said clamp means including a pair of transversely spaced apart and longitudinally extending grooves in said main body member and a spring clamp having a pair of legs each slidably and adjustably received within one of said grooves, said clamp extending substantially perpendicular to the longitudinal axis of said main body member.

2. Mail handling apparatus as set forth in claim 1, wherein said fulcrum member further comprises a substantially arcuate projection having an outwardly disposed straight edge intermediate each side of said projection, the thickness of said straight edge being substantially less than the distance between the sides of each of said transversely extending grooves.

References Cited in the file of this patent

UNITED STATES PATENTS

| | | |
|---|---|---|
| 49,059 | Savy | June 26, 1865 |
| 227,050 | Palmer | Mar. 27, 1880 |
| 549,534 | Riess | Nov. 12, 1895 |

FOREIGN PATENTS

| | | |
|---|---|---|
| 749,620 | France | May 8, 1933 |